United States Patent [19]

Guichard et al.

[11] Patent Number: 4,834,465

[45] Date of Patent: May 30, 1989

[54] HYDRAULIC BRAKING CIRCUIT FOR AN AIRCRAFT

[75] Inventors: Jean Guichard, La Garenne Colombes; Christian Favre, Massy, both of France

[73] Assignee: Messier-Hispano-Bugatti, Montrouge, France

[21] Appl. No.: 136,568

[22] Filed: Dec. 22, 1987

[30] Foreign Application Priority Data

Dec. 26, 1986 [FR] France .................. 86 18197

[51] Int. Cl.⁴ .................. B60T 14/18; B64D 25/42
[52] U.S. Cl. .................. 303/15; 244/111; 303/3; 303/13
[58] Field of Search .................. 303/113, 15, 16, 3, 303/13; 244/111

[56] References Cited

U.S. PATENT DOCUMENTS

| | | | |
|---|---|---|---|
| 3,481,358 | 12/1964 | Gardner | 137/118 |
| 3,671,082 | 6/1972 | Stevens | 244/111 X |
| 3,920,282 | 11/1975 | DeVlieg | 244/111 X |
| 4,264,109 | 4/1981 | Knox | 303/10 |
| 4,307,916 | 12/1981 | Straut | 303/6 |
| 4,362,339 | 12/1982 | Belart | 303/113 X |
| 4,493,509 | 1/1985 | Kilner et al. | 303/13 |

Primary Examiner—Duane A. Reger
Assistant Examiner—Matthew C. Graham
Attorney, Agent, or Firm—Gerald J. Ferguson, Jr.

[57] ABSTRACT

A hydraulic circuit for aircraft braking, the circuit including wheel brakes (11) fed with hydraulic fluid by servovalves (8, 22) mounted in a normal circuit and in an emergency circuit. The normal circuit and the emergency circuit are selectively connected to the wheel brakes by switching devices (9) and protected from excessive loss of hydraulic fluid by hydraulic fuses (6, 24). The servovalves of the normal circuit are associated in pairs. The hydraulic fuses (6) of the normal circuit are disposed upstream from the servovalves (8) on lengths of line (5) which are common to each pair of servovalves. The devices (9) for switching from the normal circuit to the emergency circuit are disposed downstream from the servovalves (8).

4 Claims, 1 Drawing Sheet

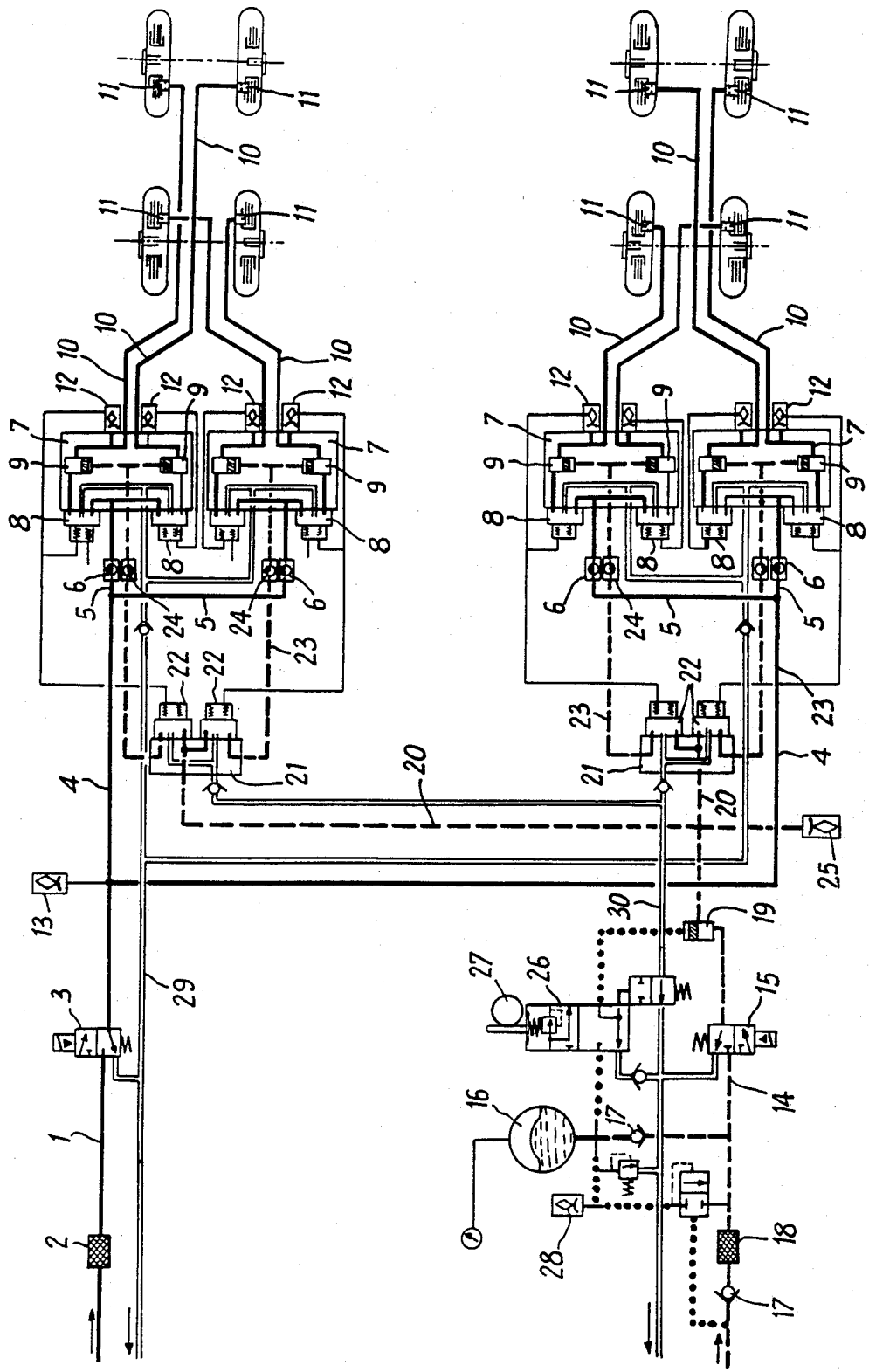

HYDRAULIC BRAKING CIRCUIT FOR AN AIRCRAFT

The present invention relates to a hydraulic braking circuit for an aircraft.

BACKGROUND OF THE INVENTION

In general, hydraulic braking circuits for aircraft comprise wheel brakes fed with hydraulic fluid via servovalves which are connected in a normal circuit and in an emergency circuit, with the normal circuit and the emergency circuit being suitable for selective connection to the wheel brakes via switching means and being protected against excessive loss of hydraulic fluid by hydraulic fuses. These hydraulic circuits are generally very complex and they include components which must be of vey high quality in order to provide good operating safety, which means that these circuits are very expensive.

An aim of the present invention is to provide a braking circuit of reduced cost while guaranteeing sufficient operating safety.

SUMMARY OF THE INVENTION

In order to achieve this aim, the present invention provides an aircraft hydraulic braking circuit of the type described above in which the normal circuit servovalves are associated in pairs, with the hydraulic fuses of the normal circuit being disposed upstream from the servovalves on lengths of line which are common to each pair of servovalves, and with the means for switching from the normal circuit to the emergency circuit being disposed downstream from the servovalves. Thus, the number of hydraulic fuses and corresponding ducts is reduced while limiting the number of brakes that are affected by any one hydraulic fuse closing. Further, by putting the switching means downstrem from the servovalves, it becomes possible to use the emergency circuit on a temporary basis on a length of line when only one of the servovalves of the normal circuit is faulty.

In an advantageous version of the invention, each servovalve of the normal circuit is associated with one wheel brake. As a result, the effect on braking of a single servovalve in the normal circuit becoming faulty is kept to a strict minimum.

In accordance with another advantageous aspect of the invention, each servovalve of the emergency circuit is associated with two switching means. Thus, while still guaranteeing the possibility of connecting each wheel brake to the emergency circuit, the cost of the emergency circuit is reduced by reducing the number of servovalves.

In a preferred embodiment of the invention, the hydraulic fuses of the emergency circuit are disposed between the servovalves and the switching means. Thus, as in the normal circuit, the number of hydraulic fuses is reduced without affecting too many wheel brakes when one of the hydraulic fuses closes.

In accordance with a preferred aspect of the invention, the servovalves are under the control of pressure sensors disposed downstream from the switching means. Thus, some of the pressure sensors serve to control both the servovalves of the normal circuit and the servovalves of the emergency circuit.

In accordance with another preferred aspect of the invention, each pair of associated servovalves is mounted on an independent base plate. Thus, if a crack occurs in a base plate it affects only a small portion of the braking circuit.

According to yet another preferred aspect of the invention, the normal circuit and the emergency circuit are each connected to a source of hydraulic fluid by a line having an electrically controlled valve connected therein, which valve is opened under the control of means taking account of the signals coming from a pressure sensor disposed downstream from the electrically controlled valve in the normal circuit. As a result, complete independence is ensured between the normal circuit and the emergency circuit all the way to the switching means disposed downstream from the servovalves of the normal circuit and of the emergency circuit.

BRIEF DESCRIPTION OF THE DRAWING

An embodiment of the invention is described by way of example with reference to the sole FIGURE of the accompanying drawing which is a diagram of a hydraulic braking circuit in accordance with the invention.

MORE DETAILED DESCRIPTION

With reference to the FIGURE, the hydraulic braking circuit comprises a normal circuit whose go ducts are drawn as thick continuous lines and an emergency circuit whose go ducts are drawn as thick dashed lines, with the return ducts of both circuits being drawn as pairs of fine lines.

The normal circuit comprises a length of feed duct 1 having a filter 1 and a normal electrically controlled valve 3 mounted thereon. Beyond the normal valve 3, the feed length 1 is split into two lengths of line 4 each serving to feed a corresponding landing gear. Each length of line 4 is in turn split into two lengths of line 5 having hydraulic fuses 6 disposed thereon. It is recalled that hydraulic fuses are valves which are normally kept open and which close in order to avoid excessive loss of hydraulic fluid in the event of a duct being broken downstream from the hydraulic fuse, thereby causing a head loss which exceeds a predetermined threshold.

Downstream from the hydraulic fuses 6, each length of circuit 5 is connected to a base plate 7 supporting a pair of servovalves 8 each of which has an input connected to the length of line 5 and an output connected to a shuttle valve 9 which is likewise mounted on the base plate 7. Downstream from the shuttle valve 9, the circuit comprises a length of line 10 conveying hydraulic fluid to a wheel brake 11 and having a pressure sensor 12 mounted thereon whose output is connected to a control input of a servovalve 8, with each servovalve 8 being also connected (by means not shown) to a processor unit which sets a reference degree of opening depending on the desired amount of braking.

At the junction between the lengths of line 4, the normal circuit includes a pressure sensor 13 connected to the processor unit in order to cause the emergency circuit to be used when the pressure at the sensor 13 drops below a given threshold while the valve 3 is open.

The emergency circuit comprises a length of feed line 14 having an electrically controlled valve 15 mounted therein and connected to the processor unit. The feed line 14 is also connected to a hydraulic accumulator 16 serving to feed the parking brake circuit as shown in dotted lines. The hydraulic accumulator 16 is suitably isolated from the length of line 14 by non-return valves 17. A filter 18 is disposed on the feed length 14. Downstream from the valve 15, the emergency circuit includes a shuttle valve 19 for switching the emergency circuit over to the parking circuit.

Downstream from the shuttle valve 19, the emergency circuit splits into two lengths 20 each of which feeds a base plate 21 having two servovalves 22 mounted thereon, each having a hydraulic fluid outlet connected via a length of line 23 including a hydraulic fuse 24 to two second inputs to two shuttle valves 9. Thus, esch servovalve of the emergency circuit is associated with two means 9 for switching from the normal circuit to the emergency circuit.

The emergency circuit includes a pressure sensor 25 disposed downstream from the valve 15, e.g. at the junction between the lengths of line 20, said sensor serving to trigger an alarm when the pressure in the emergency circuit is too low in spite of the valve 15 being open. Each of the servovalves 22 has a control input connected to a pressure sensor 12 in parallel with a servovalve 8 of the normal circuit.

The parking brake circuit comprises a distributor valve 26 whose slide is driven by a motor 27 which is itself connected to the processor unit. A pressure sensor 28 is connected in the parking braking circuit in order to trigger an alarm when there is too great a drop of pressure therein.

The return to the hydraulic fluid reserve tank is provided for the normal circuit by a network of lines 29 and for the emergency circuit by a network of lines 30.

Naturally the invention is not limited to the embodiment described and variant embodiments may be used without going beyond the scope of the invention. In particular, although the preferred embodiment described uses an emergency circuit with only one servovalve per pair of wheels, it would be possible to use an emergency circuit having a disposition analogous to that of the normal circuit which has one servovalve per wheel.

We claim:

1. A hydraulic circuit for aircraft braking comprising wheel brakes fed with hydraulic fluid by servovalves mounted in a normal circuit and in an emergency circuit, the normal circuit and the emergency circuit being selectively connectable to the wheel brakes by switching means and being protected from excessive loss of hydraulic fluid by hydraulic fuses; wherein the servovalves of the normal circuit are associated in pairs, the hydraulic fuses of the normal circuit are disposed upstream from the servovalves of the normal circuit on lengths of line which are common to the two servovalves in each of said pairs of servovalves, and said means for switching from the normal circuit to the emergency circuit are disposed downstream from the servovalves wherein each servovalve of the emergency circuit is associated with two switching means.

2. A braking circuit according to claim 1, wherein the hydraulic fuses of the emergency circuit are disposed between the servovalves of the emergency circuit and the switching means.

3. A braking circuit according to claim 1, wherein the servovalves are controlled by pressure sensors disposed downstream from the switching means.

4. A braking circuit according to claim 1, wherein the normal circuit and the emergency circuit are each connected to a fluid source via a respective line including an electrically controlled valve which is opened as a function of signals coming from a pressure sensor disposed downstream from the electrically controlled valve of the normal circuit.

* * * * *